US011596142B2

(12) United States Patent
Hagan

(10) Patent No.: US 11,596,142 B2
(45) Date of Patent: Mar. 7, 2023

(54) SYSTEM TO DETER RODENTS FROM ACCESSING A PIPE SYSTEM

(71) Applicant: Michael T. Hagan, Waverly, KY (US)

(72) Inventor: Michael T. Hagan, Waverly, KY (US)

(*) Notice: Subject to any disclaimer, the term of this patent is extended or adjusted under 35 U.S.C. 154(b) by 216 days.

(21) Appl. No.: 17/106,087

(22) Filed: Nov. 28, 2020

(65) Prior Publication Data

US 2021/0161122 A1 Jun. 3, 2021

Related U.S. Application Data

(60) Provisional application No. 63/035,808, filed on Jun. 7, 2020, provisional application No. 62/941,913, filed on Nov. 29, 2019.

(51) Int. Cl.
*F16L 57/00* (2006.01)
*A01M 29/30* (2011.01)
*F16L 41/02* (2006.01)

(52) U.S. Cl.
CPC ............ *A01M 29/30* (2013.01); *F16L 57/00* (2013.01); *F16L 41/021* (2013.01)

(58) Field of Classification Search
CPC ........ A01M 29/30; A01M 29/00; F16L 57/00; F16L 41/021; F16L 55/24; F16L 55/005; F16L 59/021; F16L 59/027; F16L 59/15; F16L 59/161; F16L 59/103; E03F 3/06
See application file for complete search history.

(56) References Cited

U.S. PATENT DOCUMENTS

| 584,646 | A | * | 6/1897 | Ott | .................................. | 43/127 |
| 789,948 | A | * | 5/1905 | Williams | ................ | F16L 57/00 |
| | | | | | | 138/139 |
| 862,698 | A | * | 8/1907 | Bierbaum | .......... | A01G 13/0243 |
| | | | | | | 47/32.4 |
| 1,052,547 | A | * | 2/1913 | Worthington | ........... | B63B 21/12 |
| | | | | | | 114/221 R |
| 1,591,902 | A | * | 7/1926 | Weinberg | .................. | D04C 1/00 |
| | | | | | | 5/482 |
| 1,819,553 | A | * | 8/1931 | Gysling | ................ | F16L 59/021 |
| | | | | | | 138/147 |
| 2,040,786 | A | * | 5/1936 | Ford | ..................... | F16L 59/161 |
| | | | | | | 220/592.2 |

(Continued)

FOREIGN PATENT DOCUMENTS

DE 19910439 A1 * 9/2000 ................ E03F 3/06
EP 0763685 A1 * 3/1997
(Continued)

*Primary Examiner* — Matthew Troutman
*Assistant Examiner* — James A Linford
(74) *Attorney, Agent, or Firm* — Brian W. Chellgren; James C. Eaves, Jr.; Dentons Bingham Greenebaum LLP

(57) ABSTRACT

A rodent deterrent system for a pipe system, the pipe system including a T-junction and a midsection riser. The deterrent system for the T-junction includes a first mesh screen configured to surround a vertical portion of the T-junction and a second mesh screen configured to surround a horizontal portion of the T-junction. Also, the deterrent system for a perforated riser includes a mesh wrap sleeve configured to surround the midsection of the riser. Alternatively, the riser midsection sleeve can be lengthened so that the second mesh is not needed as the lengthened sleeve also performs the same function as the second screen.

20 Claims, 18 Drawing Sheets

(56) References Cited

U.S. PATENT DOCUMENTS

| | | | | |
|---|---|---|---|---|
| 4,757,638 | A * | 7/1988 | Lafforthun | A01M 23/08 |
| | | | | 119/427 |
| 5,413,149 | A * | 5/1995 | Ford | F16L 57/06 |
| | | | | 428/36.1 |
| 5,581,934 | A * | 12/1996 | Arnold, Sr. | A01M 23/00 |
| | | | | 210/162 |
| 5,931,200 | A * | 8/1999 | Mulvey | F16L 19/0212 |
| | | | | 138/109 |
| 6,520,201 | B2 * | 2/2003 | Sweeney | F16L 59/161 |
| | | | | 138/149 |
| 9,691,527 | B2 * | 6/2017 | Adachi | H01R 13/6592 |
| 2004/0109965 | A1 * | 6/2004 | Klinklin | H02G 3/0481 |
| | | | | 428/36.3 |
| 2006/0288956 | A1 * | 12/2006 | Miller | A01M 29/30 |
| | | | | 119/712 |
| 2009/0223584 | A1 * | 9/2009 | Gray | F16L 57/00 |
| | | | | 138/104 |
| 2011/0005807 | A1 * | 1/2011 | Chesnais | H02G 15/007 |
| | | | | 138/110 |
| 2016/0050904 | A1 * | 2/2016 | Turner, Jr. | H02G 3/0418 |
| | | | | 49/464 |
| 2018/0245730 | A1 * | 8/2018 | Yaeger | A01M 29/30 |

FOREIGN PATENT DOCUMENTS

| | | | | |
|---|---|---|---|---|
| GB | 578697 | A | * 10/1944 | |
| GB | 2133498 | A | * 7/1984 | B29C 53/20 |

\* cited by examiner

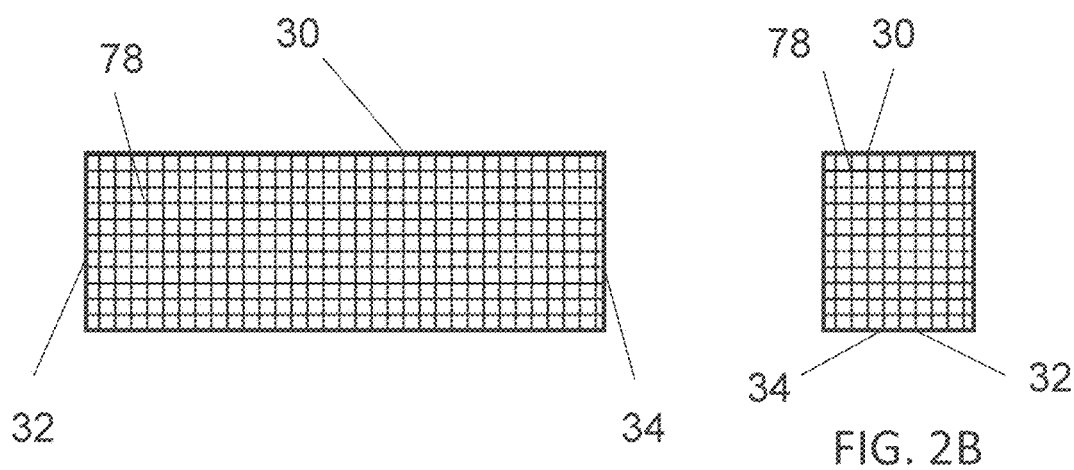
FIG. 2A
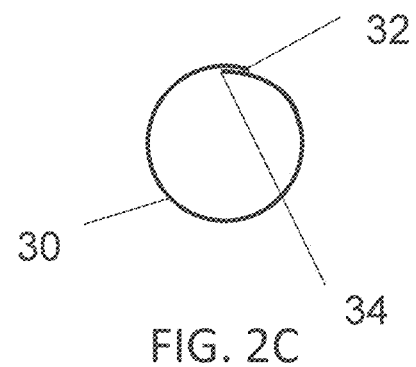
FIG. 2B
FIG. 2C

SYSTEM TO DETER RODENTS FROM ACCESSING A PIPE SYSTEM

FIELD OF THE INVENTION

A system to deter rodents from accessing a pipe system may include a first mesh screen configured to surround a horizontal portion of a T-junction, a second mesh screen configured to surround a vertical portion of the T-junction, and/or a riser mesh screen to surround at least a midsection of a vertical riser extending upward from the T-junction vertical portion.

BACKGROUND OF THE INVENTION

A perforated riser is a vertical stand pipe with a plurality of regularly spaced holes about its circumference. Risers systems are used to relocate surface water to prevent soil erosion. In a typical system, a perforated riser is oriented vertically, with a top section of the riser extending above ground, a midsection predominantly buried underground (a portion may extend above ground), and a T-junction at the bottom of the midsection. In typical embodiments, the top section, midsection, and T-junction can be readily assembled and disassembled. The top section includes relatively large holes which, in some embodiments, have a diameter of about 1". The midsection includes relatively small holes which, in some embodiments, have a diameter of about 5/16". Water enters the vertically-oriented top section and midsections of the perforated riser through the holes, travels down to the T-junction via gravity, then moves through into a second pipe attached to the riser via the T-junction. The second pipe leads the water to a drain tile system that releases the water into a nearby stream, pond, or other water feature. In some riser systems, the end of the T-junction opposite the second pipe is capped or otherwise sealed.

When installed, the top section of the riser is above ground, and includes relatively large holes in its outer surface to accept a relatively large inflow of water. The midsection of the riser may be partially above ground and partially underground or may be completely below ground, and includes relatively small holes in its outer surface to allow inflow of water without being so large as to allow significant influx of soil. The T-junction is positioned substantially entirely underground, unless soil erosion causes it to emerge, and lacks holes in its outer surface, as its purpose is to act as a conduit directing water collected by the top section and midsection to the second pipe. Influx of soil into the riser provides a means for soil erosion at the location of the riser, and the soil may clog the riser system, decreasing or blocking water flow through the system.

Rodents cause persistent problems with risers systems. Voles, field mice, and other rodents often chew holes in perforated risers, either enlarging existing holes or creating new holes. These rodent-created holes are typically larger than the holes designed into the riser, particularly in the midsection, allowing unwanted soil influx into the riser system. In addition, rodents may physically enter the riser through the created or enlarged holes, then chew new holes in the T-junction or second pipe. These new holes allow water to leak out of the riser system in undesired locations and allow soil to enter the system through the new holes. Rodents may also travel through the riser system and connected pipes, arriving in locations where they are unwanted.

The current method of addressing this problem is to remove the rodent-damaged top section, midsection, or T-junction and replace it with a new riser component. There is a need for more efficient and cost-effective methods for addressing this problem.

SUMMARY

The present invention is a rodent deterrent system for a perforated riser comprising a mesh wrap configured to surround the T-junction of the riser. Also, a mesh wrap may surround at least the midsection of the riser. The wrap deters rodents from chewing into the portion of the riser protected by the wrap.

More specifically, the present invention is for a system to deter rodents from accessing a pipe system including a midsection riser pipe. The deterrent system has a riser mesh screen folded so that opposed ends align, a strap, preferably polypropylene, folded over the aligned ends and sewn along the length of the screen to form a screen, the screen having a diameter so that it will fit over the midsection riser pipe and a length at least as long as the length of the midsection riser pipe.

Even further, the pipe system can also include a T-junction having three openings, two of the openings aligned at opposing ends of a first generally cylindrical portion, the third opening at the end of a second generally cylindrical portion, transverse to the first generally cylindrical portion, the third opening receiving one end of the midsection riser pipe. The deterrent system can then further include a first mesh screen having opposed long sides and opposed short sides, the opposed long sides having elliptical cutouts therein, each of the long sides having a strap, preferably polypropylene, folded over their side portion from their respective elliptical cutout to the first short side, the straps sewn along their length to secure each strap to the screen, with a fastener material, preferably a hook and loop material, then being sewn to these straps along their lengths; the elliptical cutouts having a binder material, such as a carpet binder material, sewn along the edges of each cutout; the first mesh screen folded so that the opposed long ends align, another strap, preferably polypropylene, folded over the second short end and along the aligned long ends from the second short end to the elliptical cutouts and sewn along the length of the strap to form a sewn shut portion; the first screen sized such that the sewn short portion will fit over the T-junction from the first end along the first generally cylindrical portion to the second generally cylindrical portion, the elliptical cutouts will surround the circumference of the second generally cylindrical portion, and the portion with the fastener material will fit over the rest of the first generally cylindrical portion to at least the second end.

Also, the present invention is for a pipe system having a T-junction having three openings, two of the openings aligned at opposing ends of a first generally cylindrical portion, the third opening at the end of a second generally cylindrical portion, transverse to the first generally cylindrical portion; a midsection riser pipe, one end of the midsection riser pipe received by the T-junction third opening; and a system to deter rodents from accessing the pipe system including a riser mesh screen folded so that opposed ends align, a strap folded over the aligned ends and sewn along the length of the screen to form a screen, the screen having a diameter so that it will fit over the midsection riser pipe and a length at least as long as the length of the midsection riser pipe, where the screen is placed over the midsection riser pipe.

Even further, this pipe system can include a first junction pipe having its first end received by the T-junction first opening, the second end of the first junction pipe being closed; a second junction pipe having its first end received by the T-junction second opening; the system to deter rodents from accessing the pipe system further includes a first mesh screen having opposed long sides and opposed short sides, the opposed long sides having elliptical cutouts therein, each of the long sides having a strap folded over their side portion from their respective elliptical cutout to the first short side, the straps sewn along their length to secure each strap to the screen, with a fastener material then being sewn to these straps along their lengths; the elliptical cutouts having a binder material sewn along the edges of each cutout; the first mesh screen folded so that the opposed long ends align, another strap folded over the second short end and along the aligned long ends from the second short end to the elliptical cutouts and sewn along the length of the strap to form a sewn shut portion; the first screen sized such that the sewn short portion will fit over the length of the first junction pipe from its closed end and the T-junction from the first end along the first generally cylindrical portion to the second generally cylindrical portion, the elliptical cutouts can surround the circumference of the second generally cylindrical portion, and the portion with the fastener material will fit over the rest of the first generally cylindrical portion to its second end and along at least a portion of the length of the second junction pipe; where the first mesh screen has its sewn shut portion placed over the first junction pipe and along a portion of the first generally cylindrical portion, the elliptical cutouts surround the circumference of the second generally cylindrical portion, and the portion with the fastener material is placed over the rest of the first generally cylindrical portion to its second end and along at least a portion of the length of the second junction pipe and the fastener material is closed.

At least two alternatives are then possible where the pipe system has the T-junction and the midsection riser pipe attached thereto. First, where the screen has a length longer than the length of the midsection riser pipe, the length portion longer than the midsection riser pipe has at least one slit, but preferably a pair of slits therein to create a pair of flaps, so that the screen is sized such that it will fit over the midsection riser pipe and the second generally cylindrical portion of the T-junction and where the flaps will engage the first generally cylindrical portion. Second, where the screen has a length approximately the same length as the midsection riser pipe, a second mesh screen formed into a generally cylindrical shape slightly enlarged at its bottom to form a skirt is needed. The second mesh screen will have a diameter so that it can be placed over the midsection riser pipe and over the second generally cylindrical portion of the T-junction to be placed over the second generally cylindrical portion, the second mesh screen having a length sufficient to surround the second generally cylindrical portion from the third opening to its terminus at the first generally cylindrical portion. Both of these alternatives permit either the longer sleeve and the first mesh or the shorter sleeve and the first and second meshes to fully surround at least the midsection riser pipe and the T-junction to deter rodents from eating into them. Also, as the midsection riser pipe and the T-junction may be underground, once the sleeve and screen(s) are placed onto the midsection riser pipe and the T-junction, a tape or similar material should be used to better secure the sleeve and screen(s) in place so that they are not dislodged when burying them.

It will be appreciated that the various systems and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

A better understanding of the present invention will be had upon reference to the following description in conjunction with the accompanying drawings.

FIG. 2A depicts a schematic front view of a second mesh screen in sheet form.

FIG. 2B depicts a schematic side view of the second mesh screen in cylindrical form.

FIG. 2C depicts a schematic end view of the second mesh screen in FIG. 1B.

DETAILED DESCRIPTION OF THE PREFERRED EMBODIMENTS

Figure 1A:
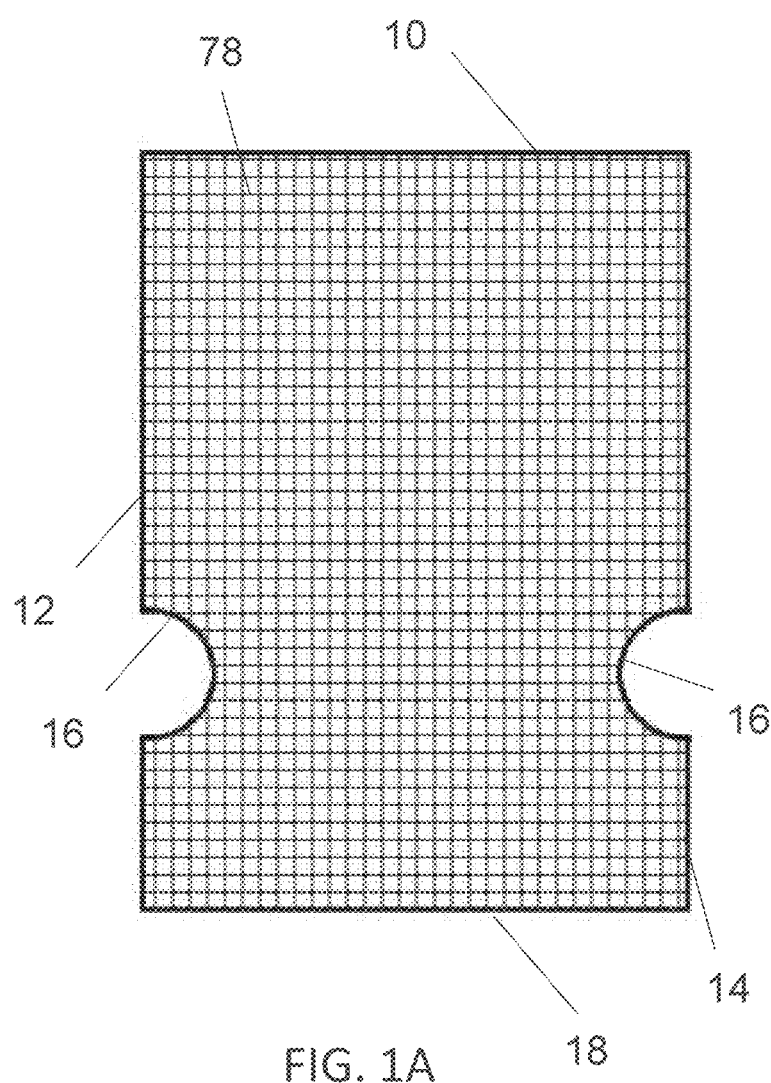
FIG. 1A depicts a schematic front view of a first mesh screen in sheet form.

Embodiments of the present invention include a rodent deterrent system including a first mesh screen and a second mesh screen for at least partially enclosing a T-junction portion of a riser system as well as a riser mesh screen surrounding at least a portion of the midsection of the riser. The following items and reference numbers are used in the drawings: 10, 110—first mesh screen; 12, 112—long side; 14, 114—long side; 16, 116—elliptical cutouts; 18, 118—short side; 20, 120—approximately circular aperture; 30—second mesh screen; 32—first short side; 34—second short side; 40, 140, 240—riser mesh screen; 42, 142—first end; 44, 144—opposed second end; 46—tape; 48—voids; 50—T-junction; 52—cylindrical horizontal portion; 54—first end; 56—second end; 58—cylindrical vertical portion; 60—second pipe; 62—end cap; 64—top end of vertical portion; 68—tape; 70—skirt of second mesh screen; 78—voids; 80—riser; 82—top section; 83—top section holes; 84—riser midsection; 88—midsection holes; 90—rodent created hole; 119—sewn shut portion; 148, 248—polopropylene strap; 172—carpet binder; 174—webbing/polypropylene strap; 176—hook and loop fastener; 177—cavity, 247—slit; 249—flap.

Figure 1B:
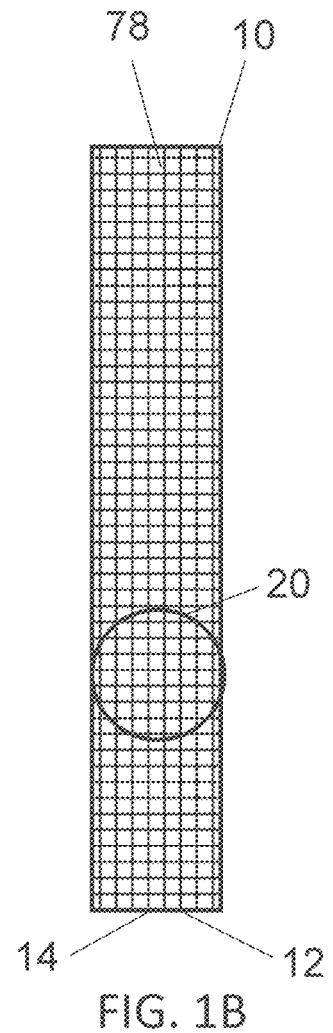
FIG. 1B depicts a schematic side view of the first mesh screen in cylindrical form.
Figure 1C:
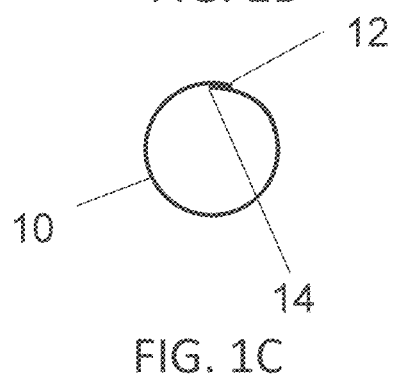
FIG. 1C depicts a schematic end view of the first mesh screen in FIG. 1B.

With reference to FIGS. 1A, 1B, and 1C, the first mesh screen 10 is, in some embodiments, a wire mesh screen composed of aluminum or other sufficiently resilient metal or non-metal material. In the depicted exemplary embodiment, the first mesh screen 10 initially is a rectangular sheet 26.25 inches wide and 36 inches tall. Each long side 12, 14 of the first mesh screen includes an elliptical cutout 16 with a minor axis of 6.25 inches along the long side 12, 14 and a semi-major axis of 3.25 inches extending into the mesh. The cutouts 16 are centered 11 inches from the nearest short side 18 of the mesh screen. When in use, the first mesh screen 10 is wrapped into a cylindrical shape sized to encircle the horizontal portion of a T-junction, with the vertical portion of the T-junction extending through the paired cutouts 16, which cooperatively form an approximately circular aperture 20 in the surface of the first mesh screen. Preferably the first mesh screen 10 is wrapped into a cylindrical shape such that a first long side 12 overlays the opposing second long side 14 by about 2 inches, the first mesh screen 10 thereby forming a cylindrical shape 36 inches long and with a circumference of about 24.25 inches and a diameter of about 7.7 inches. At least one of the long sides 12, 14 is then affixed to the first mesh screen 10 via tape, adhesive, hook-and-loop fasteners (e.g., VELCRO® fasteners), welding, mechanical fasteners, or other means or combination of means known in the art to secure the first mesh screen 10 in cylindrical shape. In some embodiments, the portion of the first mesh screen 10 wherein the first long side 12 overlays the second long side 14 is treated with a silicone adhesive.

With reference to FIGS. 2A, 2B, and 2C, the second mesh screen 30 is, in some embodiments, a wire mesh screen composed of aluminum. In the depicted exemplary embodiment, the second mesh screen 30 initially is a rectangular sheet 24.75 inches wide and 9 inches tall. When in use, the second mesh screen 30 is wrapped into a cylindrical shape sized to encircle the vertical portion of a T-junction. Preferably the second mesh screen 30 is wrapped into a cylindrical shape such that a first short side 32 overlays the opposing second short side 34 by about 2 inches, the second mesh screen 30 thereby forming a cylindrical shape 9 inches tall and with a circumference of about 22.75 inches and a diameter of about 7.25 inches. At least one of the short sides 32, 34 is then affixed to the second mesh screen 30 via tape, adhesive, hook-and-loop fasteners, welding, mechanical fasteners, or other means or combination of means known in the art to secure the second mesh screen 30 in cylindrical shape. In some embodiments, the portion of the second mesh screen 30 wherein the first short side 32 overlays the second short side 34 is treated with a silicone adhesive.

Commercially available T-junctions typically include a horizontal portion 21.5 inches or 24 inches in length with a diameter of 7.5 inches, and a vertical portion having a diameter of 7 inches extending perpendicularly from the horizontal portion for 7.5 inches, with one end of the horizontal portion being covered by an end cap and the opposite end of the horizontal portion being attached to a second pipe. A first mesh screen 10 of the dimensions recited above is sized to loosely fit over the 7.5 inch diameter of the horizontal portion of such a typical T-junction. The excess length of the first mesh screen 10 may be used to cover a portion of the second pipe or may be gathered and sealed via tape, adhesive, welding, mechanical fasteners, or other means or combination of means known in the art to cover the end cap, or both. The second mesh screen 30 of the dimensions recited above is sized to loosely fit over the vertical portion of the T-junction, with vertical slits cut in the lower portion of the second mesh screen 30 to allow it to spread over the horizontal portion of the T-junction. In other embodiments, the second wire mesh screen 30 may be formed in a frustoconical shape, with a larger diameter lower end or skirt portion adapted to drape over the horizontal portion of the T-junction.

Other embodiments of the first mesh screen 10 and second mesh screen 30 may be larger or smaller in their various dimensions to fit larger or smaller T-junctions, or to fit more snugly or more loosely. In some embodiments, the first and second mesh screens 10, 30 are constructed with selvedge edges. In other embodiments, other types of edges may be used.

Figure 3:
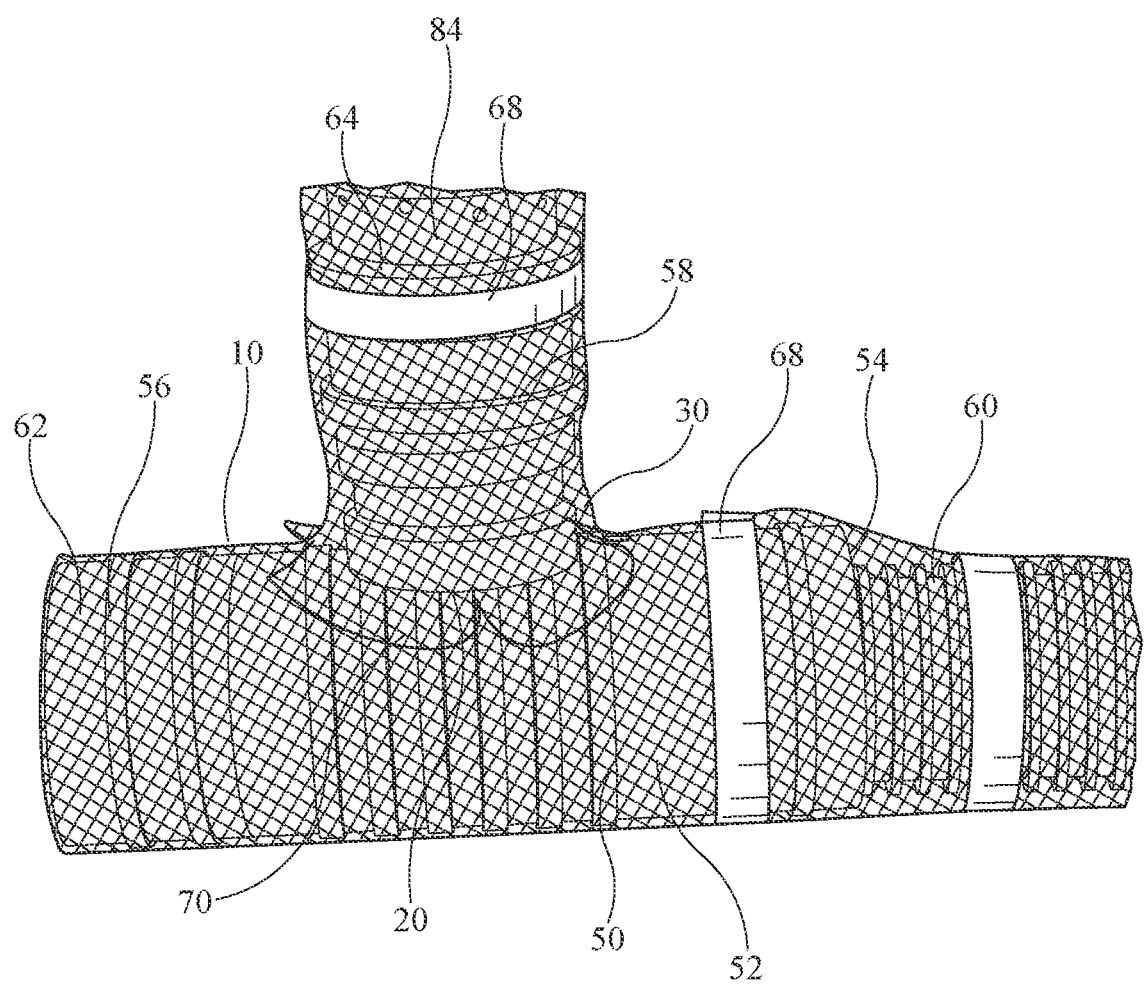
FIG. 3 depicts a side view of a T-junction with first and second mesh screens mounted thereon.
Figure 4:
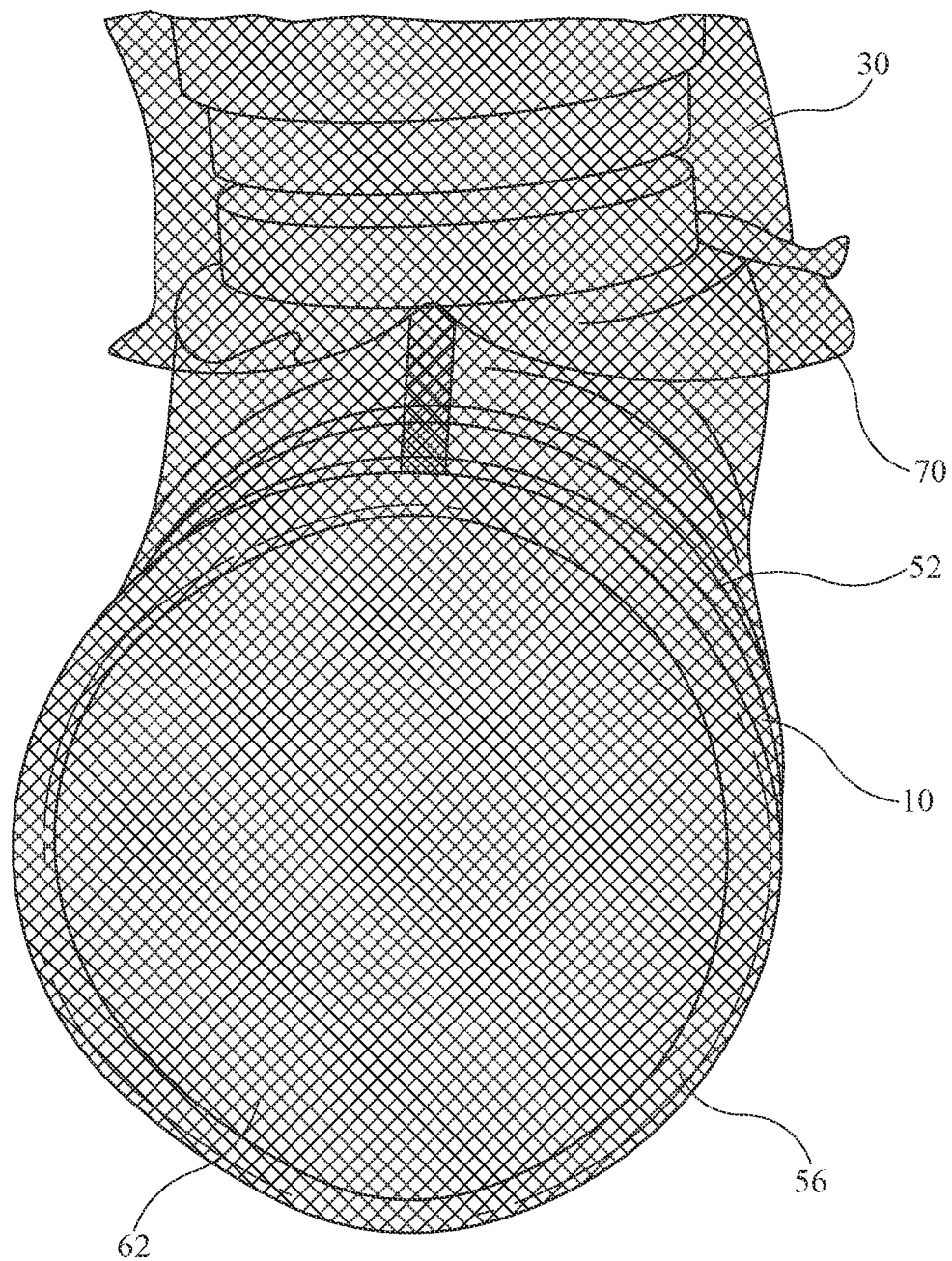
FIG. 4 depicts a second end view of T-junction of FIG. 3.

Referring now to FIGS. 3 and 4, a T-junction 50 is shown having a cylindrical horizontal portion 52 with opposing first and second ends 54, 56. The T-junction 50 further includes a cylindrical vertical portion 58 extending perpendicularly from the horizontal portion 52. A second pipe 60 is attached to the first end 54 and an end cap 62 seals the second end 56. The vertical portion 58 includes a top end 64 which is attached to a riser midsection 84 extending vertically upwards therefrom.

For installation, the sheet-shaped first mesh screen 10 is positioned beneath a T-junction 50. The first mesh screen 10 is then wrapped around the circumference of the horizontal portion 52, with the vertical portion 58 extending through the aperture 20. The first mesh screen 10 is then optionally pulled tight around the circumference of the horizontal portion 52, and the slack excess circumferential material bent over and secured via tape 68 or other means resulting in a tighter fit between the first mesh screen 10 and T-junction 50. The second mesh screen 30 is then wrapped around the circumference of the vertical portion 58, optionally pulled tight, and the slack excess circumferential material bent over and secured via tape 68 or other means resulting in a tighter fit between the second mesh screen 30 and T-junction 50. The height of the second mesh screen 30 is preferably greater than the height of the vertical portion 58, such that slack excess height material extends over the horizontal portion 52, forming a skirt 70 thereon. In preferred embodiments, the first and second mesh screens 10, 30 are installed prior to attaching the T-junction 50 to riser midsection 84 and second pipe (not shown).

Referring now to FIGS. 5-9, a second embodiment of the first mesh screen 110 has the same components and dimensions as shown and described in connection with FIGS. 1A-1C, but is wrapped into a cylindrical shape and installed on the T-junction in a different manner. Similar to the first embodiment 10, the second embodiment of the first mesh screen 110 includes long sides 112, 114, elliptical cutouts 116, and short sides 118.

The second embodiment of the first mesh screen 110 is wrapped into a cylindrical shape by overlaying the first long side 112 over the second long side 114 such that the cutouts 116 cooperatively form an approximately circular aperture 120. In this embodiment, a carpet binder 172 in sewn onto the first mesh 110 atop the cutouts 116. The long sides 112, 114, and the short side 118 intended to cover the end cap 62 are substantially covered by a webbing 174, such as, for example, a 2 inch polypropylene webbing, with hook-and-loop fasteners 176 sewn or otherwise attached thereto, such that they may be removably attached together so that the mesh screens 110 may be transitioned between a sheet shape and a cylindrical shape as desired and the end cap 62 may be covered.

For installation, the sheet-shaped first mesh screen 110 is positioned beneath a T-junction 50. The first mesh screen 110 is then wrapped around the circumference of the horizontal portion 52, with the vertical portion 58 extending through the aperture 120. The long sides 112, 114 and short side 118 covering the end cap 62 are then removably sealed via the hook-and-loop fastener 176. The opposite short side covering the first end 54 remains unsealed to, forming a cavity 177 in which the second pipe (not shown) may be inserted to engage the first end 54. The second mesh screen 30 (not shown in FIGS. 5-9) is then wrapped around the circumference of the vertical portion 58 as described above.

Both the first mesh screen 10, 110 and second mesh screen 30 include a plurality of voids 78 formed between the wires of the mesh. These voids may be rectangular, circular, or of other geometric or non-geometric shape, and may be of various sizes or uniform size. In some embodiments, each void is not more than $5/16$" in its largest dimension.

Figure 10A:
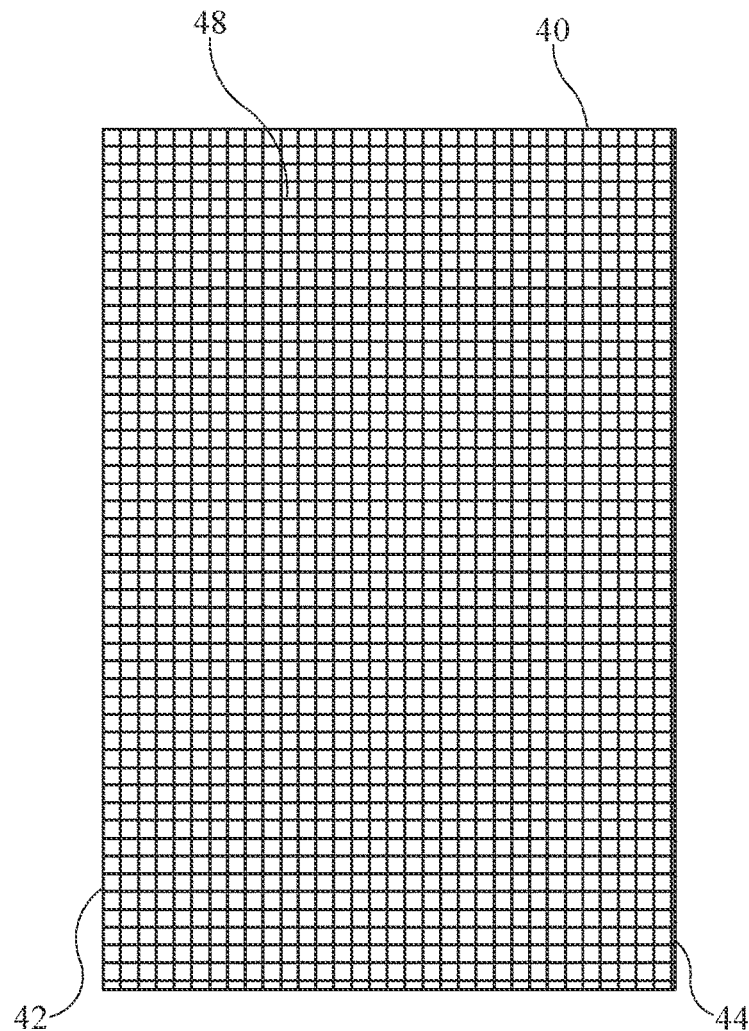
FIG. 10A depicts a schematic front view of a mesh screen in sheet form.
Figure 10B:
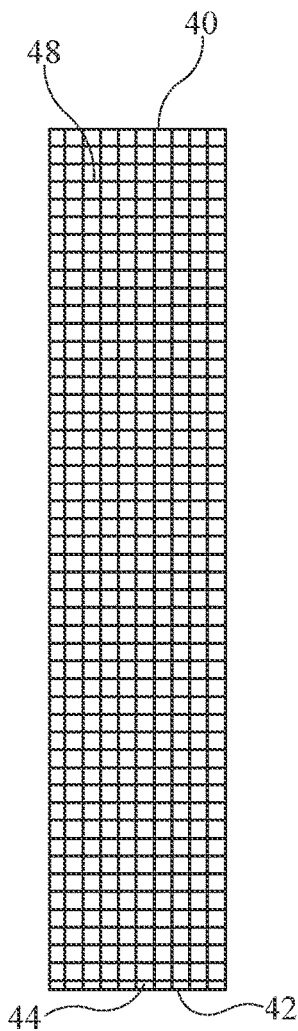
FIG. 10B depicts a schematic side view of the mesh screen in cylindrical form.
Figure 10C:
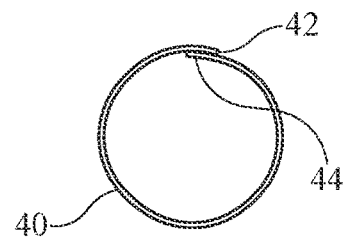
FIG. 10C depicts a schematic end view of the mesh screen in FIG. 1B.
Figure 12:
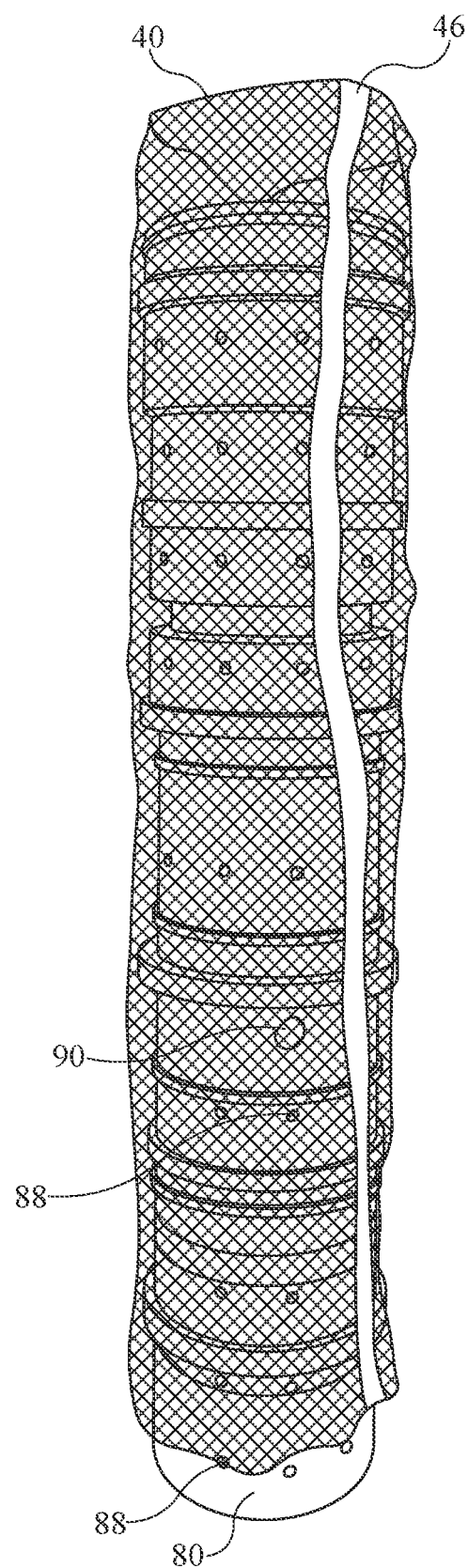
FIG. 12 depicts a side view of a mesh screen mounted on a riser midsection.
Figure 13:
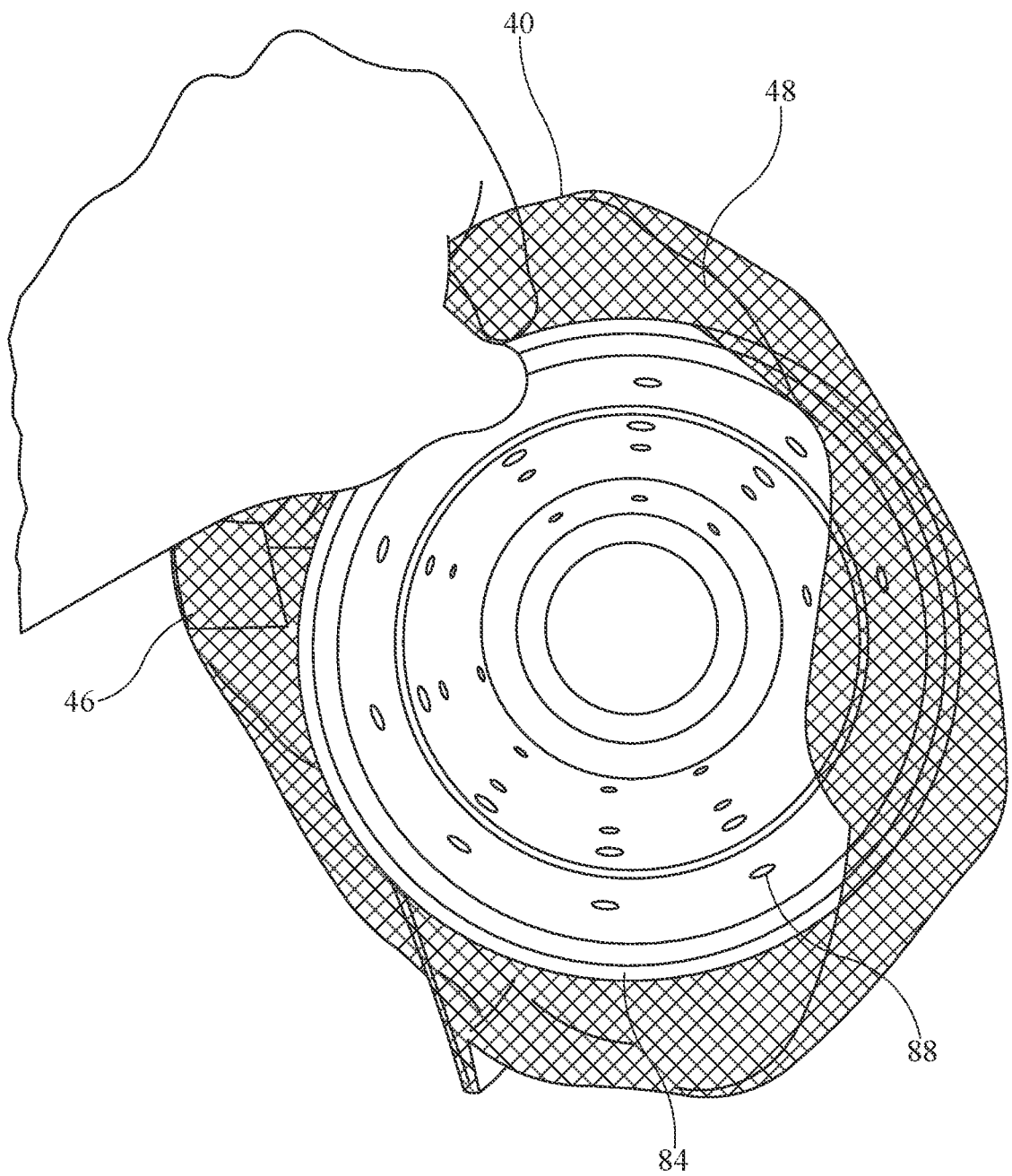
FIG. 13 depicts an end view of the mesh screen and riser midsection in FIG. 3.

With reference to FIGS. 10, 12 and 13, a rodent deterrent system includes a mesh screen for partially enclosing a perforated riser. In an exemplary embodiment, as shown in FIG. 10A, the mesh screen 40 initially is a rectangular sheet 24" wide and 36" tall. In some embodiments, the mesh screen 40 is a wire mesh screen composed of aluminum. The mesh screen 40 is wrapped into a cylindrical shape sized to encircle a portion of a riser, such as, for example, the midsection. Preferably the mesh screen is wrapped into a cylindrical shape such that a first end 42 the mesh screen 40 overlays an opposing second end 44. In some embodiments, the first end 42 may overlay the second end 44 by about 1", the mesh screen thereby forming a cylindrical shape with a height of 36", and circumference of about 23" and a diameter of about 7.3". At least one of the ends 42, 44 is then affixed to the mesh screen 40 via tape, adhesive, welding, mechanical fasteners, or other means or combination of means known in the art. In some embodiments, the portion of the mesh screen 40 wherein the first end 42 overlays the second end 44 is treated with a silicone adhesive. A mesh screen 40 of these dimensions is sized to loosely fit over a 6" diameter riser. Other embodiments may be larger or smaller in their various dimensions to fit larger or smaller risers, or to fit more snugly or more loosely.

In use, the cylindrical-shaped mesh screen 40 is slid over a riser 80. The mesh screen 40 is then optionally pulled tight around the circumference of the riser 80, and the slack excess material bent over and secured via tape 46 or other means resulting in a tighter fit between the mesh screen 40 and riser 80. In certain embodiments, the mesh screen 40 is installed on a midsection 84 prior to burying at least a portion and up to the entirety of the midsection 84 underground. In embodiments where a portion of the midsection 84 extends aboveground after burial, a corresponding portion of the mesh screen 40 would also extend aboveground.

Figure 11:
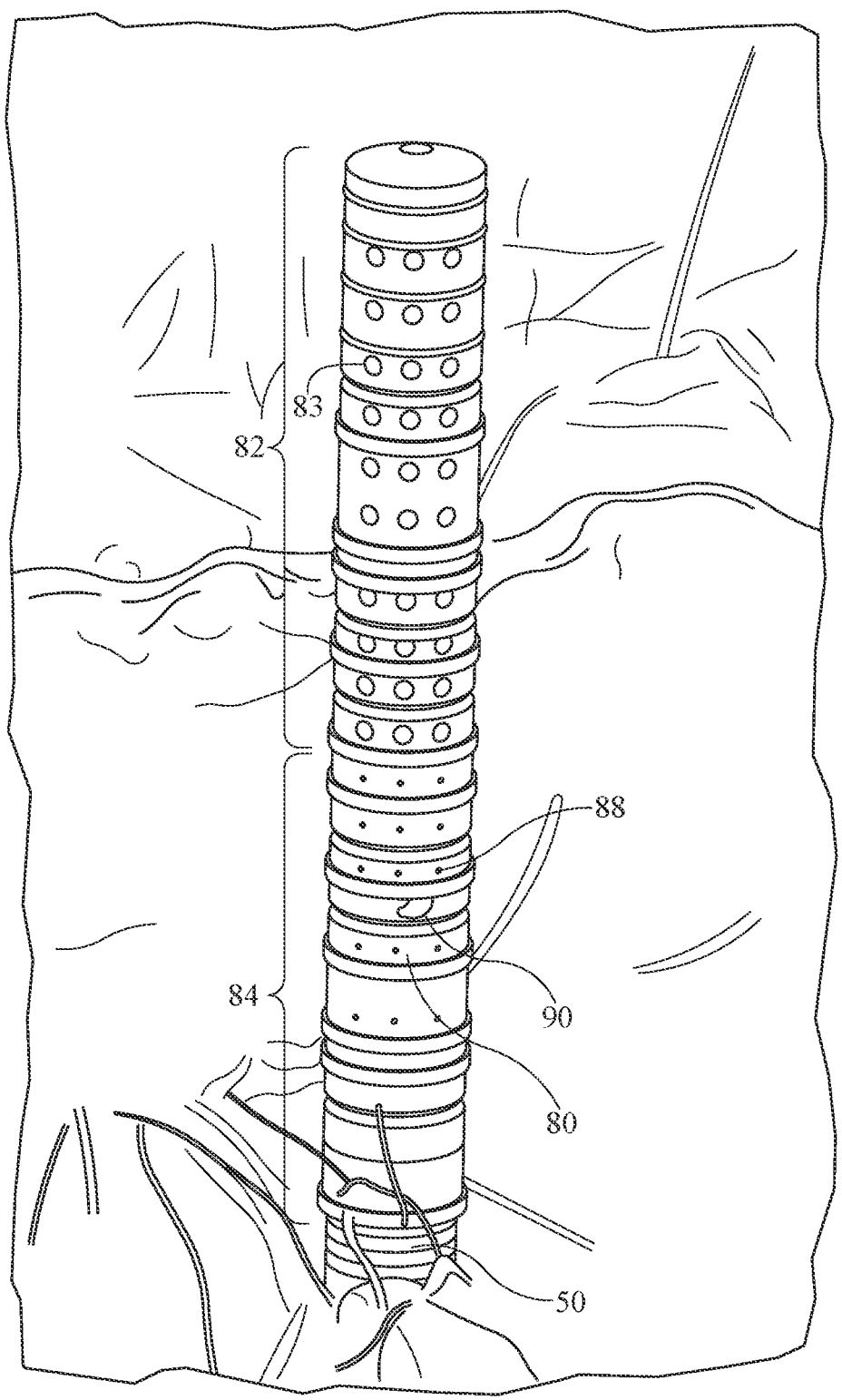
FIG. 11 depicts an installed riser system.

FIG. 11 shows a riser 80 installed in the ground. The riser 80 includes a top section 82 and a midsection 84. Also shown is a T-junction 50. In typical use, the T-junction 50 and at least a portion, and up to the entirety, of riser midsection 84 would also be buried underground. However, soil erosion has resulted in the exposure of the midsection 84 and a portion of the T-junction 50. A plurality of top section holes 83 are spaced around the circumference of the top section 82. A plurality of midsection holes 88 are spaced around the circumference of the midsection 84. FIG. 11 also shows a larger rodent-created hole 90 gnawed in the midsection 84.

FIGS. 12 and 13 show a mesh screen 40 as fitted on a midsection 84 of a cylindrical perforated riser 80. FIG. 12 also shows a larger rodent-created hole 90 gnawed in the riser 80 prior to the mesh screen 40 being mounted thereon. The mesh screen includes a plurality of voids 48 formed between the wires of the mesh. These voids may be rectangular, circular, or of other geometric or non-geometric shape, and may be of various sizes or uniform size. In preferred embodiments, the voids are smaller than the midsection holes 88. In some embodiments, each void is not more than $5/16$" in its largest dimension. Experimental evidence has shown that rodents either cannot or will not penetrate the first and second mesh screens 10, 110, 30 to gnaw on the T-junction protected thereby. The mesh screens 10, 110, 30 thereby provide an inexpensive and effective barrier against rodent damage to the T-junction and other components of a riser system. Likewise, experimental evidence has shown that rodents either cannot or will not penetrate the riser mesh screen 40 to gnaw on the riser protected thereby. The riser mesh screen thereby provides an inexpensive and effective barrier against rodent damage to the riser and also acts as a filter to reduce soil entering the riser through the holes.

Figure 14:
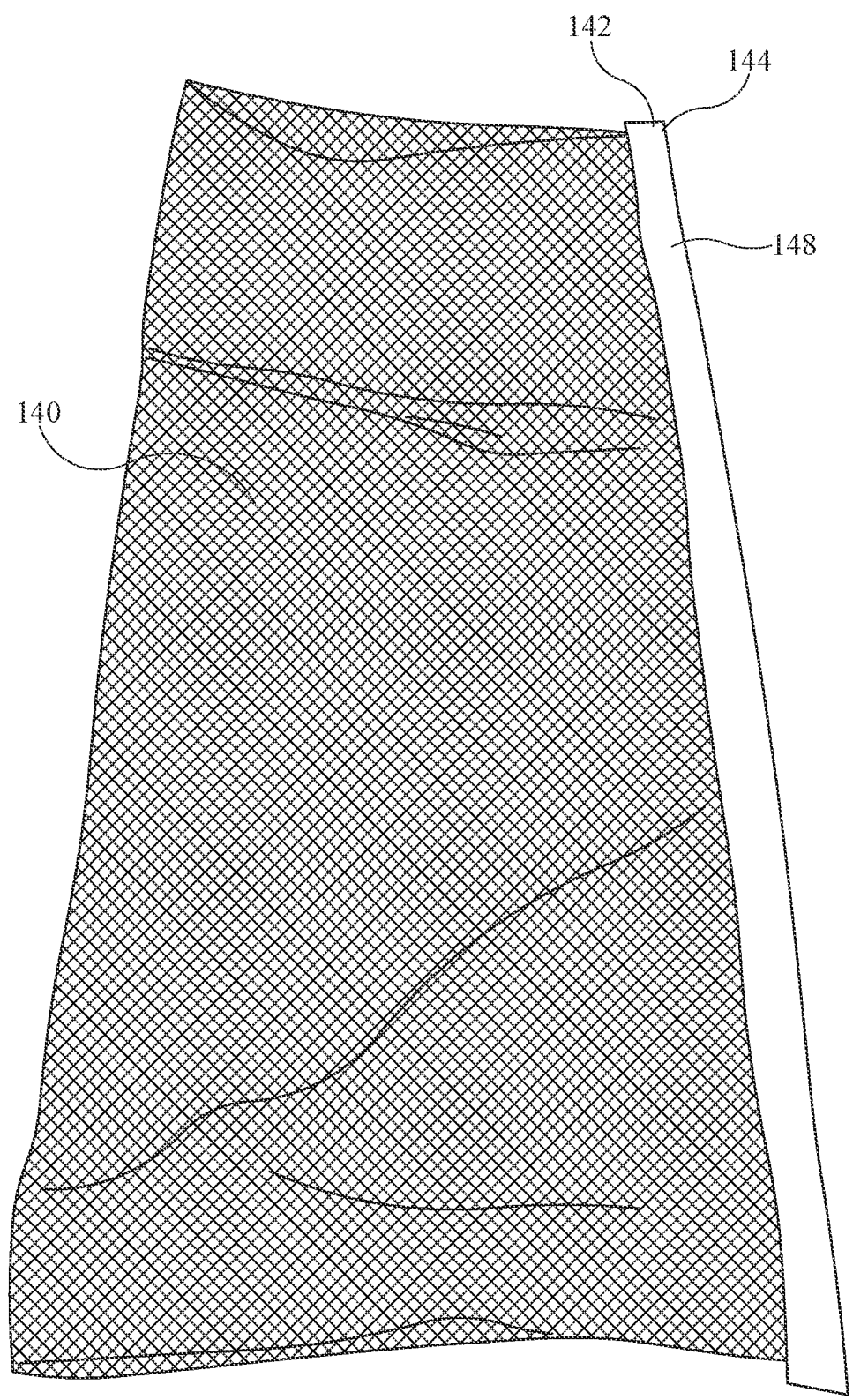
FIG. 14 depicts a second embodiment of a riser mesh sleeve.

FIG. 14 shows a second embodiment of a riser mesh sleeve 140. A piece of mesh screen material 24.5 inches wide and 36 inches long has its first end 142 and opposed second end 144 folded over on each other, for example, like folding a piece of paper in half. The folded mesh screen would have a width of about 12.25 inches and a length of 36 inches. A polypropylene strap material 148, about 2 inches wide, is folded in half and placed over the portion with overlaid ends 142/144 so that it runs the 36 inch length of the folded mesh screen. The folded strap material 148 with the overlaid end portion contained therein is then sewed along the 36 inch length. It is preferred that at least two sewing lines are made to secure the strap material 148 to the mesh screen. The folded mesh screen with the sewn strap material is now a sleeve 36 inches long.

Figure 15:
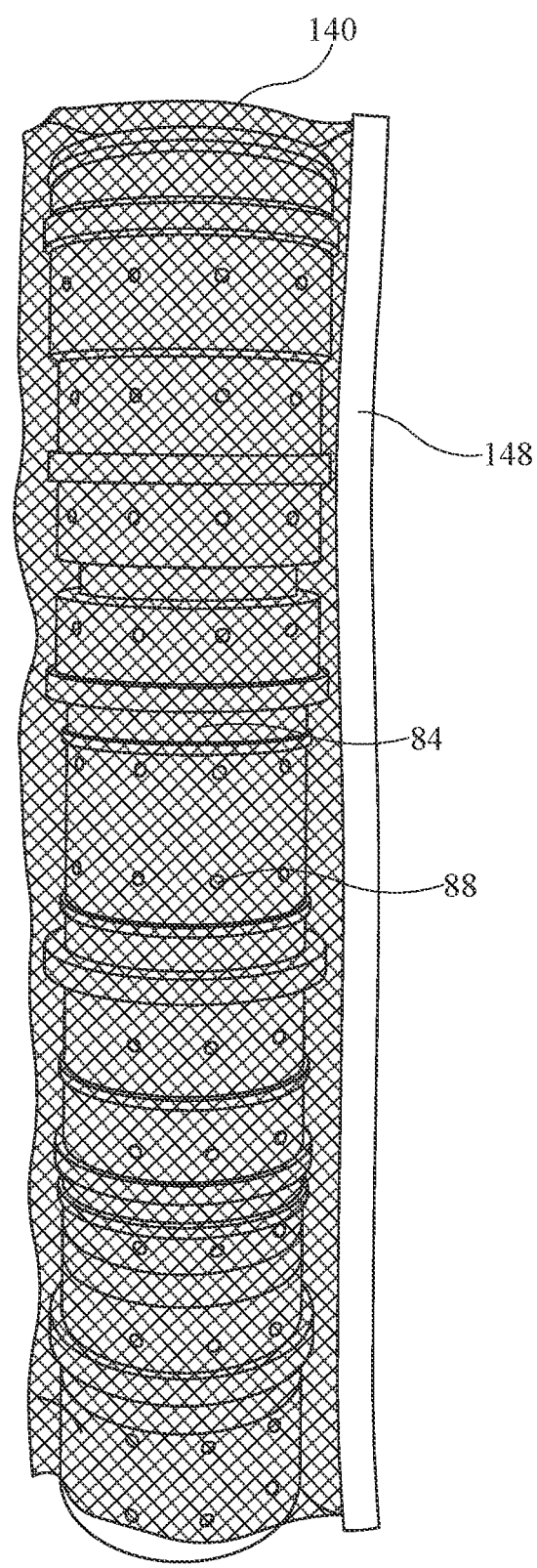
FIG. 15 shows the riser mesh sleeve of FIG. 14 inserted over a riser midsection.

Looking to FIG. 15, the riser mesh sleeve 140 of FIG. 14 inserted over a riser midsection 84 is shown. The sleeve 140 is 36 inches long and the riser midsection pipe 84 is also 36 inches long. The midsection pipe has a plurality of midsection holes 88 therethrough. The polypropylene strap 148 along the length of sleeve 140 is also shown. It is seen that the sleeve 140 fits fairly snugly around the midsection pipe 84. However, as this pipe 84 will be mostly or completely underground, the sleeve 140 should be secured to the pipe 84 and tape, such as tape 86 shown in FIG. 3, is used to tighten the sleeve 140 snugly with the pipe 84, particularly toward the top of the pipe 84.

Figure 16:
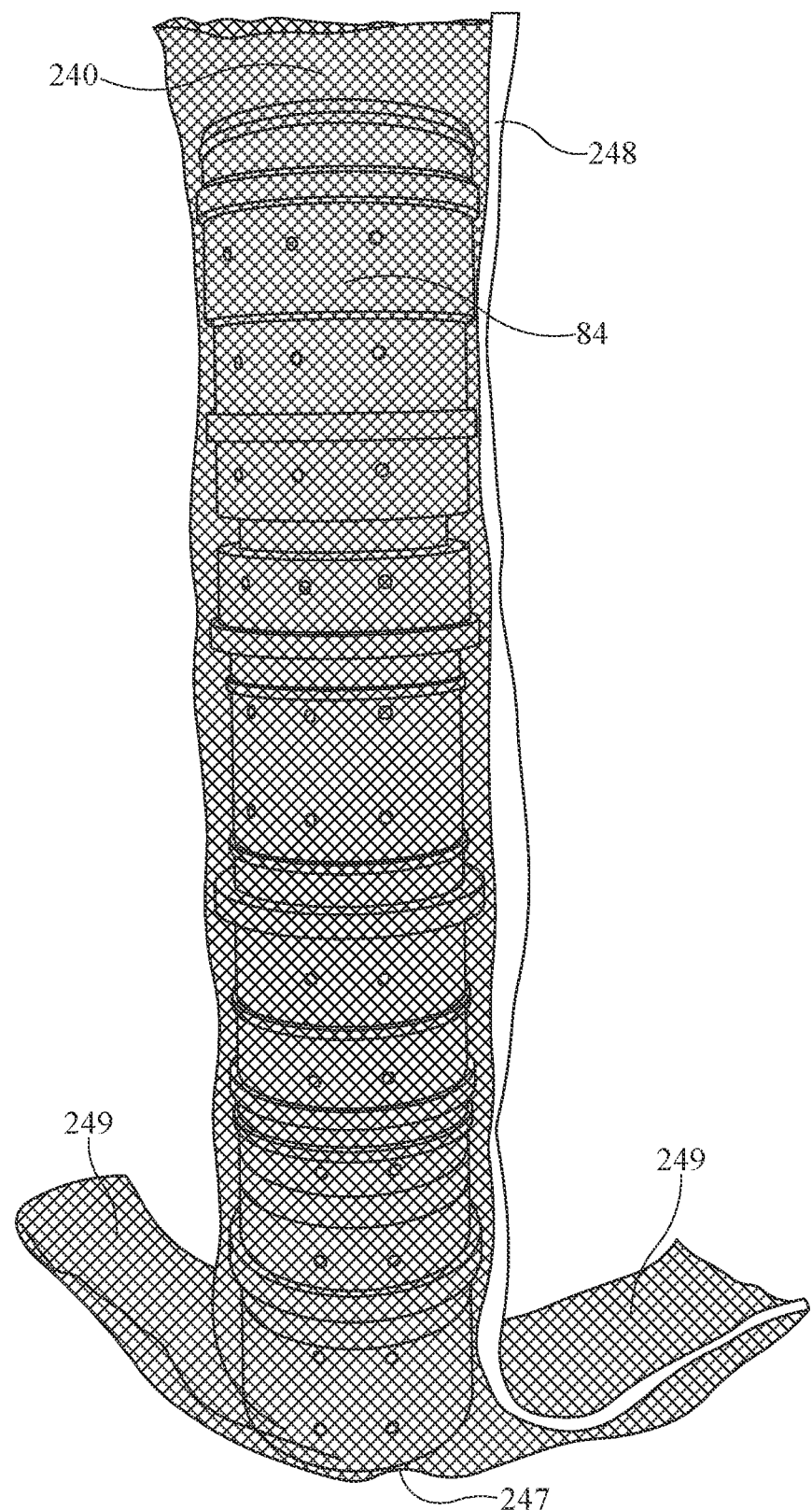
FIG. 16 depicts a third embodiment of a riser mesh sleeve inserted over a riser midsection.

FIG. 16 shows a third embodiment of a riser mesh sleeve 240 inserted over a riser midsection 84. A piece of mesh screen material 24.5 inches wide and 48 inches long has its first end and opposed second end folded over on each other, for example, like folding a piece of paper in half, as was done with the embodiment of FIGS. 14 and 15. The folded mesh screen would have a width of about 12.25 inches and a length of 48 inches. A polypropylene strap material 248, about 2 inches wide, is folded in half and placed over the portion with overlaid ends so that it runs the 48 inch length of the folded mesh screen. The folded strap material 248 with the overlaid end portion contained therein is then sewed along the 48 inch length. It is preferred that at least two sewing lines are made to secure the strap material 248 to the mesh screen. The folded mesh screen with the sewn strap material is now a sleeve 48 inches long. Looking at the bottom of FIG. 16, it is seen that there a couple of slits 247 in sleeve 240 creating a pair of flaps 249. The slits 247 are approximately 8 or so inches long. The function of flaps 249 will be explained with the description of FIG. 18.

Figure 5:
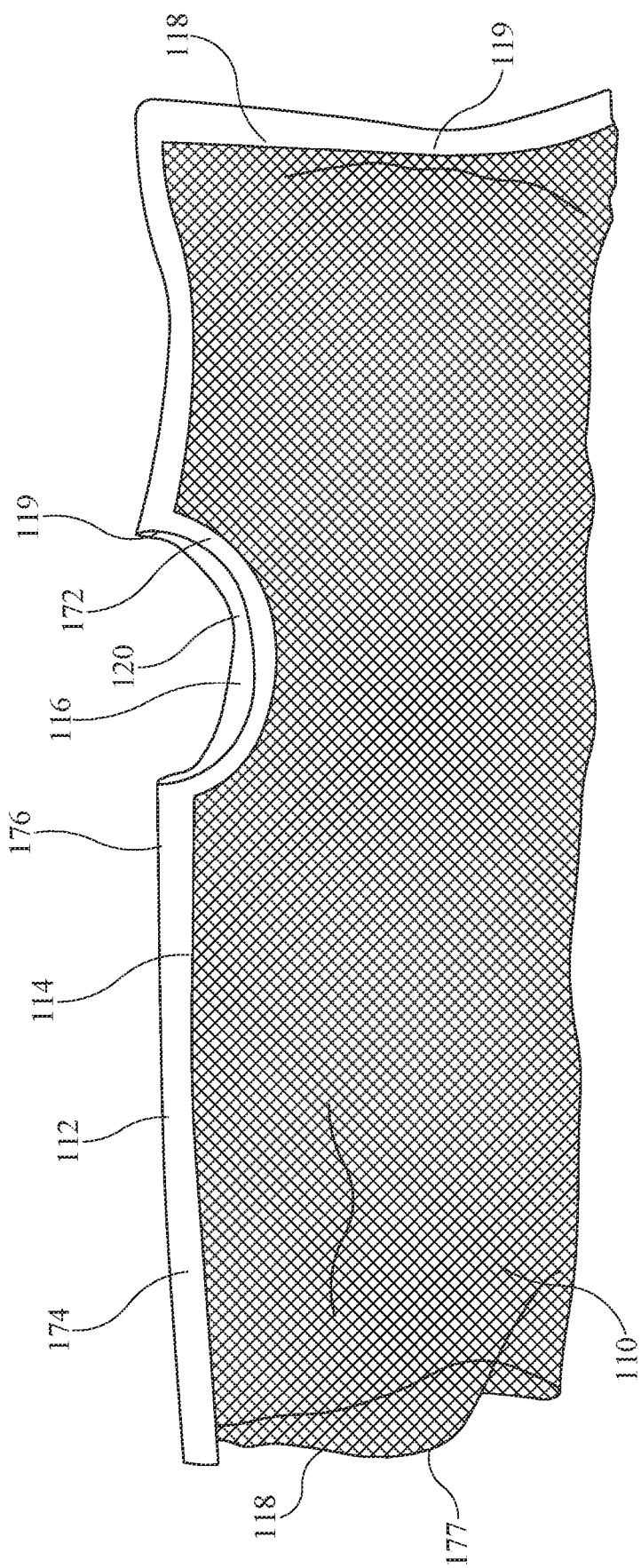
FIG. 5 depicts a side view of second embodiment of a first mesh screen.
Figure 6:
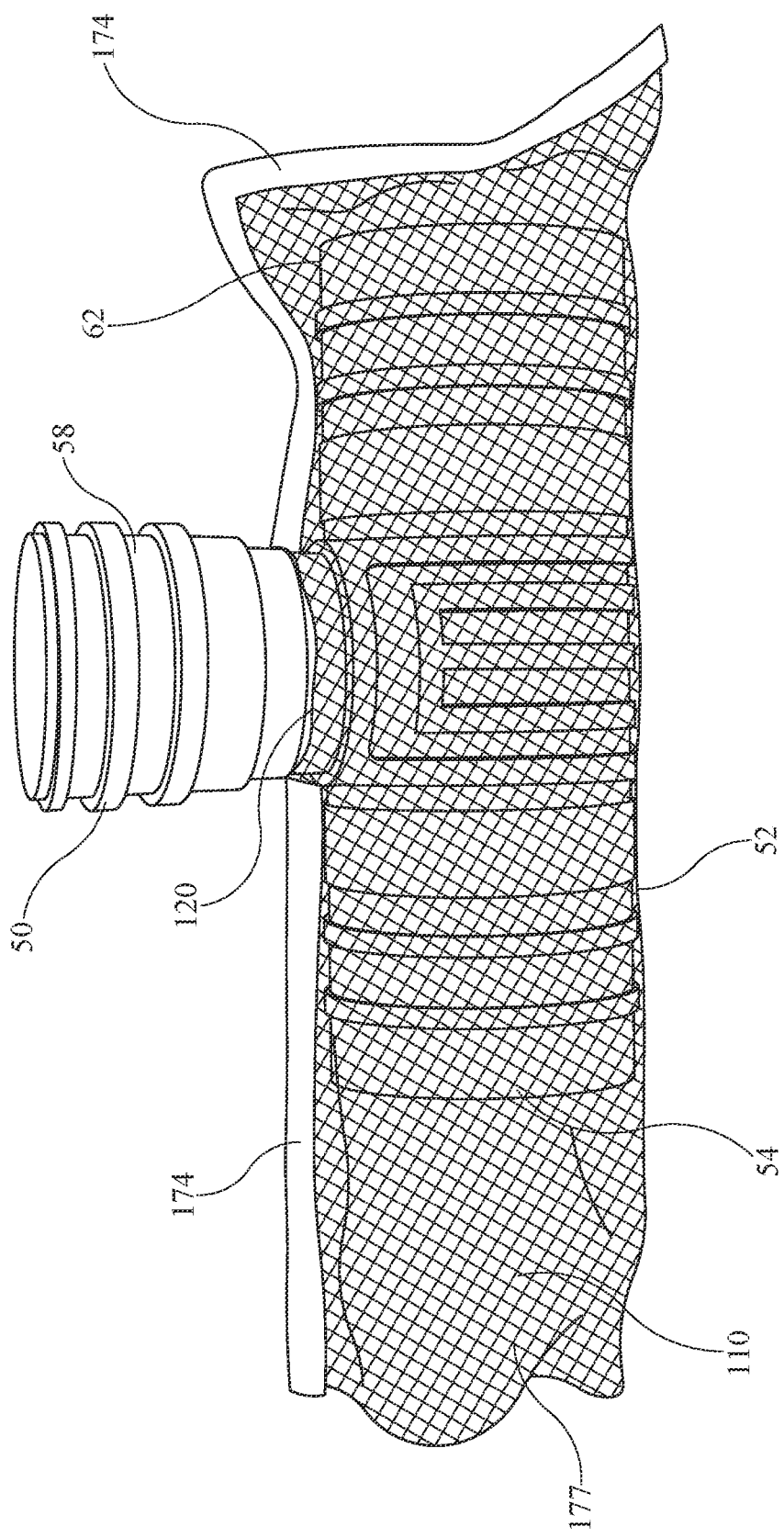
FIG. 6 depicts a side view of the second embodiment of the first mesh screen installed on a T-junction.
Figure 7:
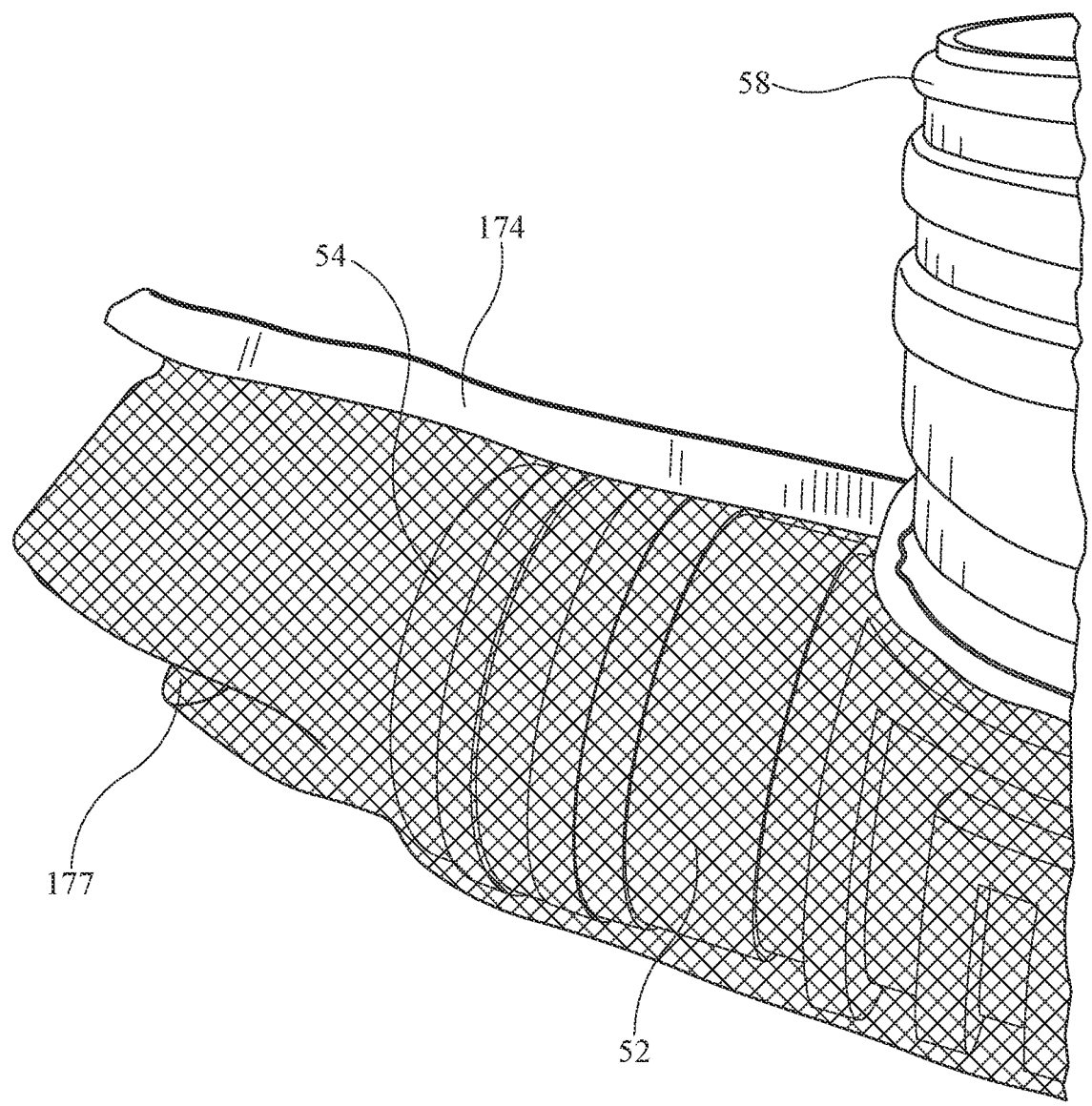
FIG. 7 depicts a side perspective view of the second embodiment of second embodiment of the first mesh screen installed on a T-junction, displaying the end of the T-junction for connecting to the second pipe.
Figure 8:
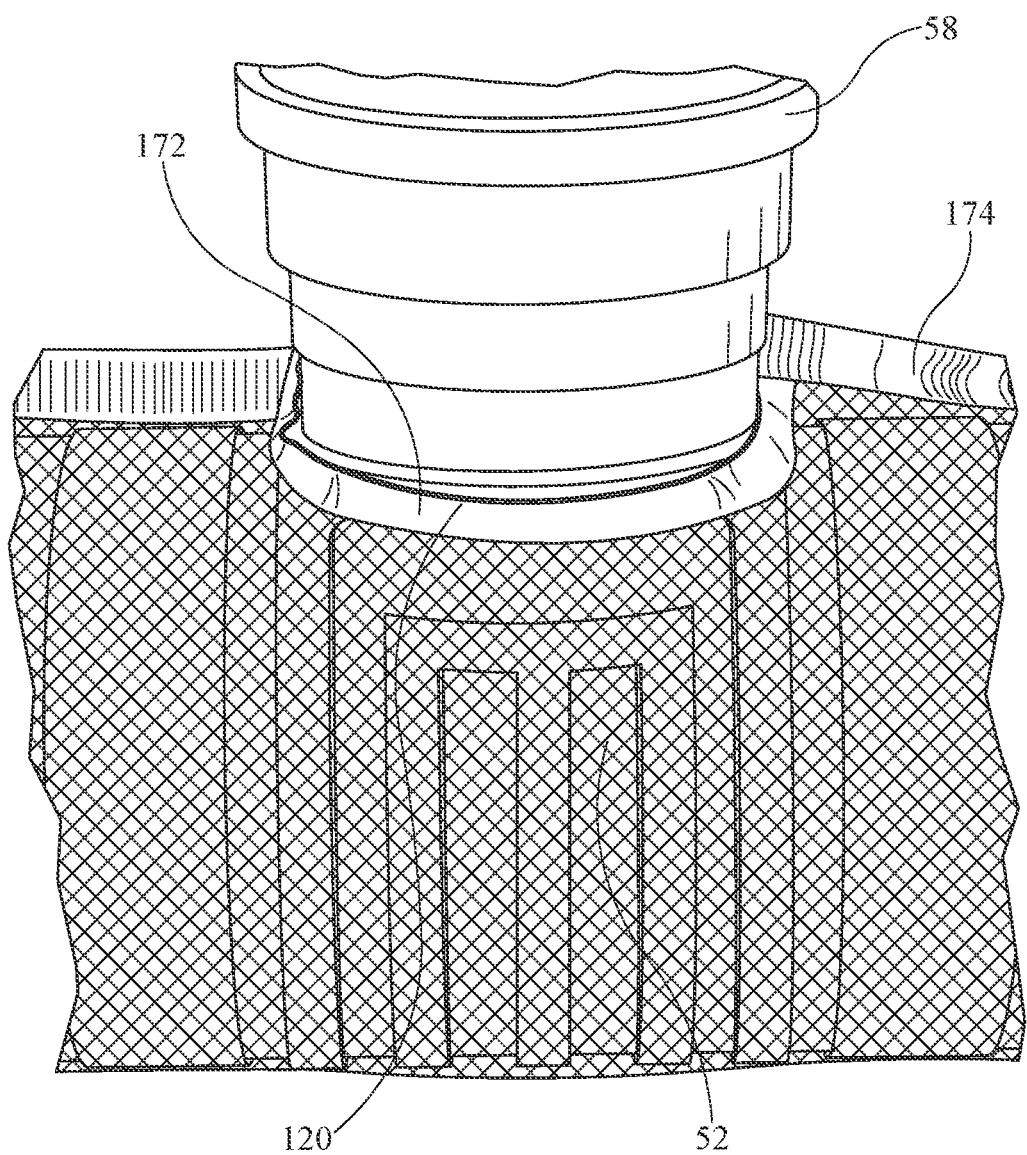
FIG. 8 depicts a side perspective view of the second embodiment of second embodiment of the first mesh screen installed on a T-junction, displaying the vertical portion of the T-junction.
Figure 9:
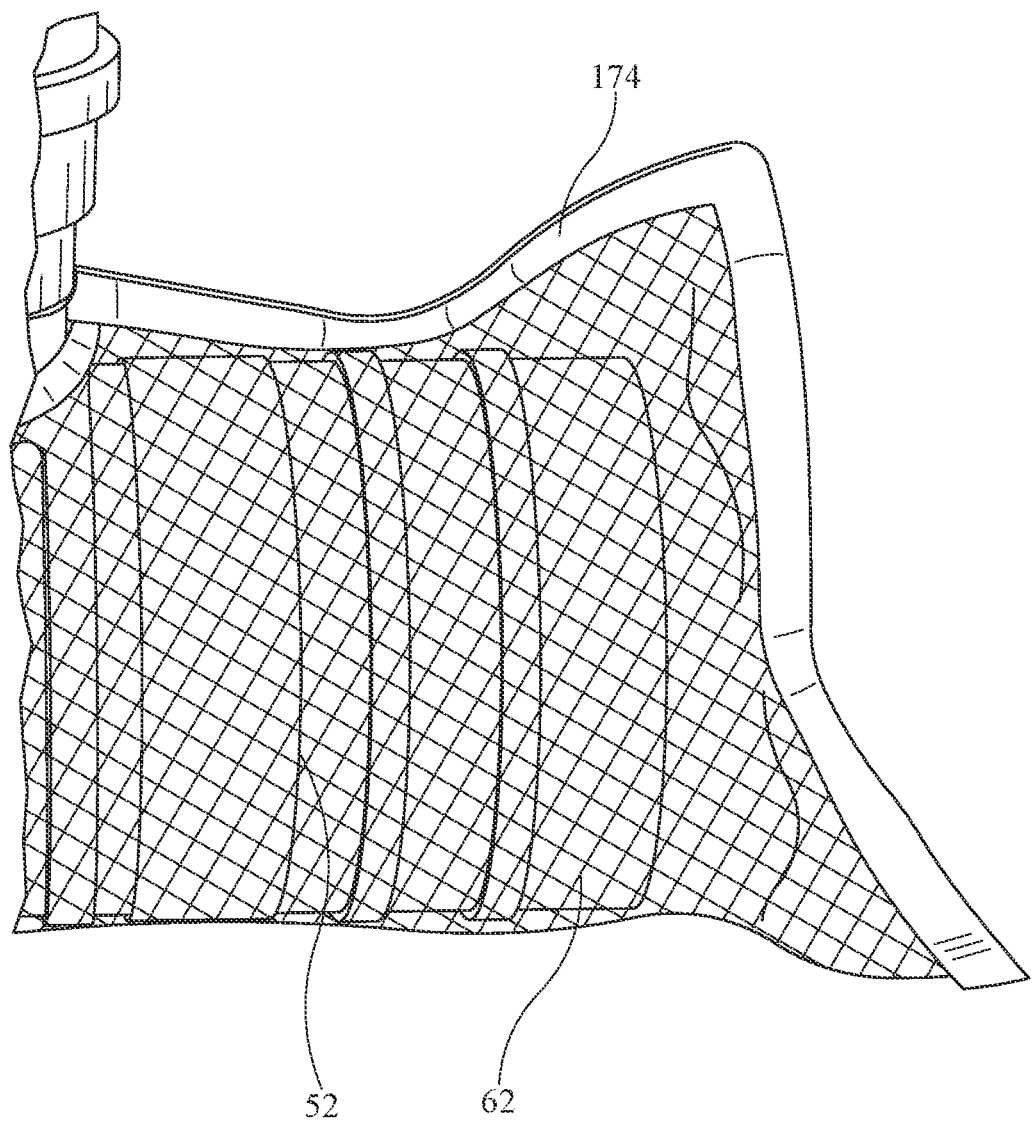
FIG. 9 depicts a side perspective view of the second embodiment of second embodiment of the first mesh screen installed on a T-junction, displaying the endcap end of the T-junction.
Figure 17:
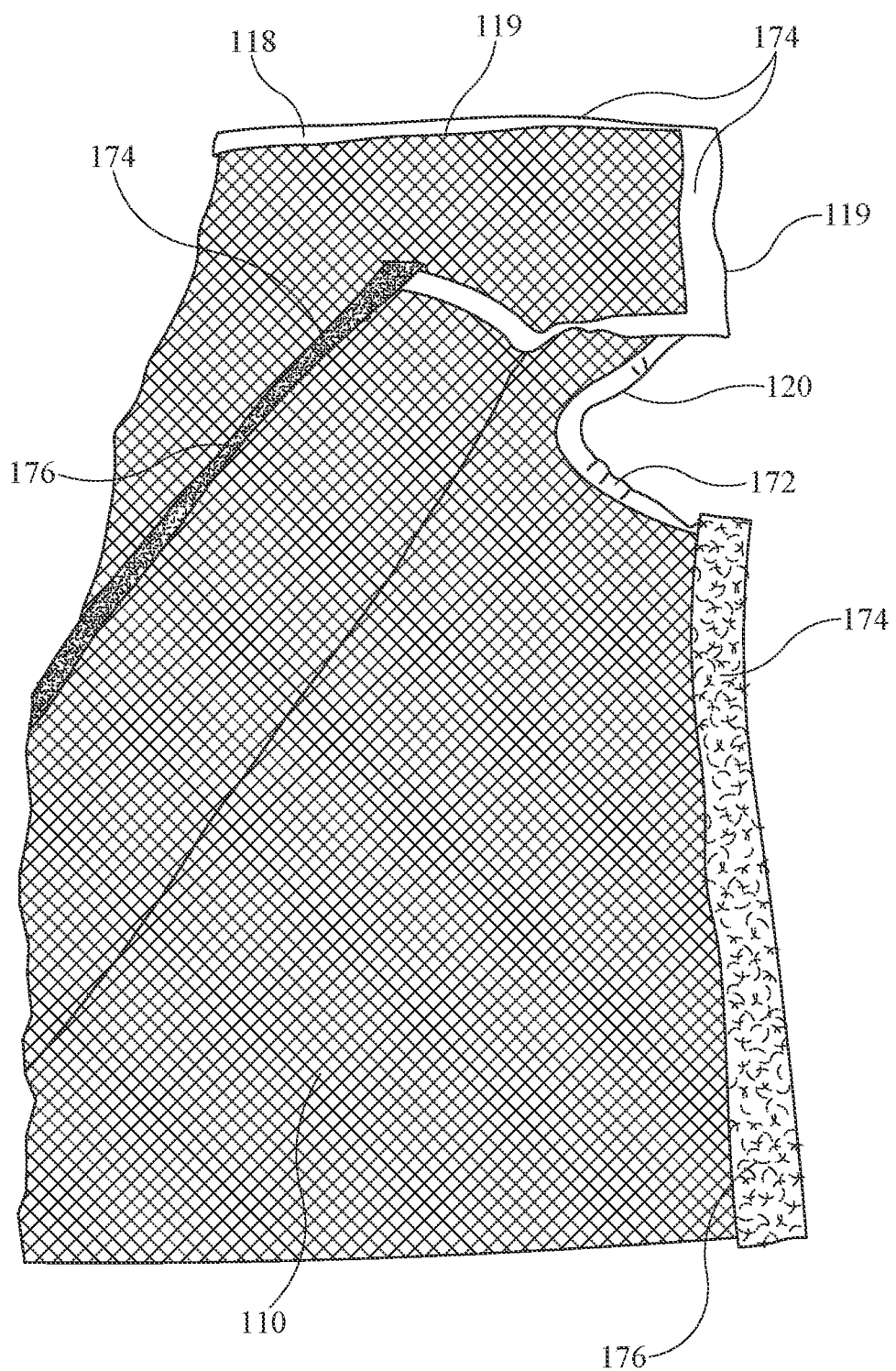
FIG. 17 shows the first mesh screen also seen in FIG. 5.

FIG. 17 shows the first mesh screen 110 also seen in FIG. 5. It is a partial view, but is useful to show the completed structure of the screen 110. A piece of mesh screen 26.25 inches wide and 36 inches long has elliptical cutouts 116 in both long sides 112 and 114 (see FIG. 5), which in use create an approximately circular aperture 120. The edges of those cutouts have a carpet binder 172 sewn thereon. From the cutouts along the remaining length of each long side, to the bottom of the mesh in the photograph, is sewn a polypropylene strap 174. Then a hook and loop fastener material 176 is sewn to each of these strap 174 sections. With short side 118, at the top of the photograph, folded over, a polypropylene strap material 174 2 inches wide is folded in half and placed over the short side 118 double thickness mesh and over the double thickness mesh from side 118 to the start of the cutouts 116 and sewn to create a sewn shut portion 119 by the same technique as was explained with the description of FIGS. 14 and 16.

Figure 18:
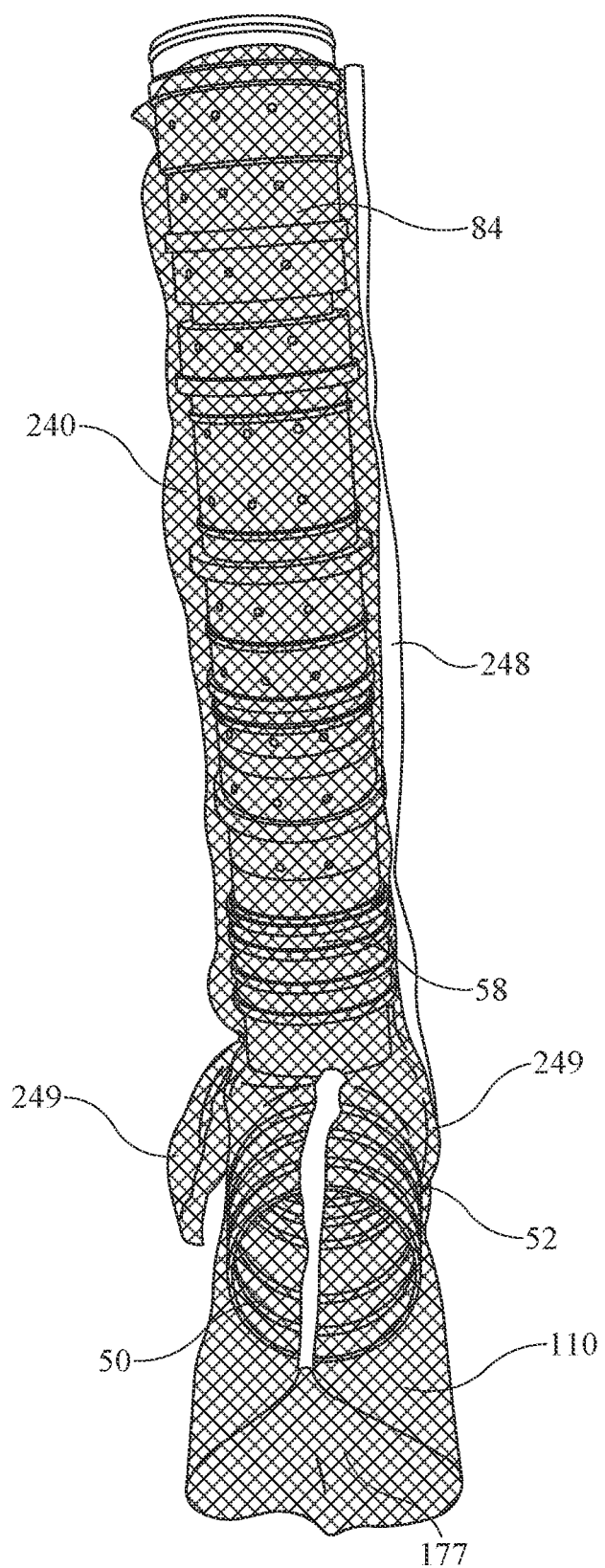
FIG. 18 shows a riser midsection having the riser mesh sleeve of FIG. 16 inserted thereover, the riser midsection connected to a T-junction, the T-junction having a first mesh screen of FIG. 17 inserted thereover.

FIG. 18 shows a riser midsection 84 having the riser mesh sleeve 240 of FIG. 16 inserted thereover, the riser midsection 84 connected to a T-junction 50, the T-junction 50 having a first mesh screen 110 of FIG. 17 inserted thereover. With reference to FIGS. 3 and 18, T-junction 50 has a cylindrical horizontal portion 52 having a first end 54 and a second end 56. T-junction 50 also has a cylindrical vertical portion 58. As seen in FIG. 3, it is envisioned that second end 56 would have an end cap 62 thereon to close that end and that first end 54 would have a second pipe 60 connected there to, which would then connect to other pipes as needed. Looking at FIG. 18, a riser midsection 58 has been inserted into the T-junction opening in the cylindrical vertical opening 58. While not installed, looking at FIG. 18, the end cap 62 would be at the back side of the cylindrical horizontal portion 52 and the second pipe 60 would be coming out toward the viewer. The riser midsection 88 is a 3 foot section and has the 48 inch length sleeve 240 placed thereover. The T-junction 50 has first mesh screen 110 placed thereover, such that the sewn shut portion 119 is at the back where end cap 62 would be. The elliptical cutouts 116 are pulled up to the base of the cylindrical vertical section 58 to form the approximately circular aperture 120. The hook and loop material 176 on the long sides 112 and 114 from the circular aperture outward are then engaged to complete the T-junction sleeve and create cavity 177, from which second pipe 60 would extend. By using the 48 inch sleeve 240 on the 36 inch riser midsection 84, the sleeve 240 can be pulled down over the top portion of the T-junction cylindrical vertical portion 58 and flaps 249 will cover over part of screen 110 so that the entire T-junction 50 and the riser midsection 84 are surrounded by sleeve 240 and screen 110. Instead of using 48 inch sleeve 240, 36 inch sleeve 140 could be used to run the length of the riser midsection 84, but the bottom of sleeve 140 would not engage with screen 110. With this configuration a second mesh screen 30, as shown and described in FIGS. 2, 3, and 4 would be required. Screen 110 would surround the cylindrical horizontal portion 52 of T-junction 50. Screen 30 would surround the cylindrical vertical portion 58 of T-junction 50 and then the 36 inch sleeve 140 would surround the riser midsection 84, so that the entire T-junction 50 and the riser midsection 84 are surrounded by sleeve 140, screen 30, and screen 110. With either sleeve 240 and screen 110 installed or sleeve 140, screen 30, and 110 installed, it is preferable that a tape 68, or other suitable material, be utilized to tighten the sleeve and screen(s) on the riser midsection and the T-junction so that sleeve and screen(s) stay surrounding the riser midsection and the T-junction as these components are placed in the ground for use.

While the present invention has been described primarily in terms of a rodent deterrent system, it may also be considered an accessory or improvement to a riser system or to a soil erosion prevention system. Also, the present invention may be used as a rodent deterrent system or accessory or improvement to other T-shaped structures apart from riser system T-junctions.

The foregoing detailed description is given primarily for clearness of understanding and no unnecessary limitations are to be understood therefrom for modifications can be made by those skilled in the art upon reading this disclosure and may be made without departing from the spirit of the invention.

The invention claimed is:

1. A system to deter rodents from accessing a pipe system including a midsection riser pipe, the deterrent system comprising: a riser mesh screen folded so that opposed ends align, a riser strap folded over the aligned ends and sewn along the length of the riser mesh screen to form a riser mesh screen assembly, the riser mesh screen assembly having a diameter so that it will fit over the midsection riser pipe and a length at least as long as the length of the midsection riser pipe.

2. The system to deter rodents of claim 1, where the pipe system further includes a T-junction having three openings, two of the openings aligned at opposing ends of a first generally cylindrical portion, the third opening at the end of a second generally cylindrical portion, transverse to the first generally cylindrical portion, the third opening receiving one end of the midsection riser pipe, the system to deter rodents further comprising: a first T mesh screen assembly including a first T mesh screen having opposed long sides and opposed short sides, the opposed long sides having elliptical cutouts therein, each of the long sides having a T strap folded over their side portion from their respective elliptical cutout to the first short side, the T straps sewn along their length to secure each T strap to the first T mesh screen, with a fastener material then being sewn to these T straps along their lengths; the elliptical cutouts having a binder material sewn along the edges of each cutout; the first T mesh screen folded so that the opposed long ends align, another T strap folded over the second short end and along the aligned long ends from the second short end to the elliptical cutouts and sewn along the length of the T strap to form a sewn shut portion; the first T mesh screen assembly sized such that the sewn short portion will fit over the T-junction from the first end along the first generally cylindrical portion to the second generally cylindrical portion, the elliptical cutouts will surround the circumference of the second generally cylindrical portion, and the portion with the fastener material will fit over the rest of the first generally cylindrical portion to at least the second end.

3. The system to deter rodents of claim 2, where the riser mesh screen assembly has a length longer than the length of the midsection riser pipe, the length portion longer than the midsection riser pipe having at least one slit therein.

4. The system to deter rodents of claim 2, where the riser mesh screen assembly has a length longer than the length of the midsection riser pipe, the length portion longer than the midsection riser pipe having a pair of slits therein to create a pair of flaps, so that the riser mesh screen assembly is sized such that it will fit over the midsection riser pipe and the second generally cylindrical portion of the T-junction and where the flaps will engage the first generally cylindrical portion.

5. The system to deter rodents of claim 2, further comprising a second T mesh screen formed into a generally cylindrical shape slightly enlarged at its bottom to form a skirt, the second T mesh screen having a diameter so that it can be placed over the midsection riser pipe and over the second generally cylindrical portion of the T-junction and placed over the second generally cylindrical portion, the second T mesh screen having a length sufficient to surround the second generally cylindrical portion from the third opening to its terminus at the first generally cylindrical portion.

6. The system to deter rodents of claim 2, where the T straps are polypropylene straps.

7. The system to deter rodents of claim 2, where the fastener material is a hook and loop material.

8. The system to deter rodents of claim 2, where the binder material is a carpet binder material.

9. The system to deter rodents of claim 1, where the riser mesh screen assembly has a length longer than the length of the midsection riser pipe, the length portion longer than the midsection riser pipe having at least one slit therein.

10. The system to deter rodents of claim 1, where the riser mesh screen assembly has a length longer than the length of the midsection riser pipe, the length portion longer than the midsection riser pipe having a pair of slits therein to create a pair of flaps.

11. The system of claim 1, where the riser strap is a polypropylene strap.

12. A pipe system, comprising:
a T-junction having three openings, two of the openings aligned at opposing ends of a first generally cylindrical portion, the third opening at the end of a second generally cylindrical portion, transverse to the first generally cylindrical portion;
a midsection riser pipe, one end of the midsection riser pipe received by the T-junction third opening;
a system to deter rodents from accessing the pipe system including a riser mesh screen folded so that opposed ends align, a riser strap folded over the aligned ends and sewn along the length of the riser mesh screen to form a riser mesh screen assembly, the riser mesh screen assembly having a diameter so that it will fit over the midsection riser pipe and a length at least as long as the length of the midsection riser pipe, where the riser mesh screen assembly is placed over the midsection riser pipe.

13. The pipe system of claim 12, where the riser mesh screen assembly is tightened around the midsection riser pipe so that riser mesh screen assembly movement is deterred.

14. The pipe system of claim 12, further comprising:
a first junction pipe having its first end received by the T-junction first opening, the second end of the first junction pipe being closed;
a second junction pipe having its first end received by the T-junction second opening;
the system to deter rodents from accessing the pipe system further includes a first T mesh screen assembly including a first T mesh screen having opposed long sides and opposed short sides, the opposed long sides having elliptical cutouts therein, each of the long sides having a T strap folded over their side portion from their respective elliptical cutout to the first short side, the T straps sewn along their length to secure each T strap to the first T mesh screen, with a fastener material then being sewn to these T straps along their lengths; the elliptical cutouts having a binder material sewn along the edges of each cutout; the first T mesh screen folded so that the opposed long ends align, another T strap folded over the second short end and along the aligned long ends from the second short end to the elliptical cutouts and sewn along the length of the T strap to form a sewn shut portion; the first T mesh screen assembly sized such that the sewn short portion will fit over the length of the first junction pipe from its closed end and the T-junction from the first end along the first generally cylindrical portion to the second generally cylindrical portion, the elliptical cutouts can surround the circumference of the second generally cylindrical portion, and the portion with the fastener material will fit over the rest of the first generally cylindrical portion to its second end and along at least a portion of the length of the second junction pipe;
where the first T mesh screen assembly has its sewn shut portion placed over the first junction pipe and along a portion of the first generally cylindrical portion, the elliptical cutouts surround the circumference of the second generally cylindrical portion, and the portion with the fastener material is placed over the rest of the first generally cylindrical portion to its second end and along at least a portion of the length of the second junction pipe and the fastener material is closed.

15. The pipe system of claim 14, where the first T mesh screen assembly is tightened around the T-junction so that first T mesh screen assembly movement is deterred.

16. The pipe system of claim 14, where the riser mesh screen assembly has a length longer than the length of the midsection riser pipe, the length portion longer than the midsection riser pipe having a pair of slits therein to create a pair of flaps, such that the riser mesh screen assembly placed over the midsection riser pipe also fits over the second generally cylindrical portion of the T-junction, the flaps engage the T-junction first generally cylindrical portion and the first T mesh screen assembly so that at least the midsection riser pipe and the T-junction are enveloped by the combination of the riser mesh screen assembly and the first T mesh screen assembly.

17. The pipe system of system of claim 14, further comprising a second T mesh screen formed into a generally cylindrical shape slightly enlarged at its bottom to form a skirt, the second T mesh screen having a diameter so that it can be placed over the midsection riser pipe and over the second generally cylindrical portion of the T-junction and placed over the second generally cylindrical portion, the second T mesh screen having a length sufficient to surround the second generally cylindrical portion from the third opening to its terminus at the first generally cylindrical portion, where the second T mesh screen is placed so that it surrounds the T-junction second generally cylindrical portion from the third opening to its terminus at the first generally cylindrical portion, the second T mesh screen engaging the riser mesh screen assembly and the first T mesh portion so that at least the midsection riser pipe and the T-junction are enveloped by the combination of the riser mesh screen assembly and the first and second T mesh screens.

18. The pipe system of claim 14 where the T straps are polypropylene straps.

19. The pipe system of claim 12, where the riser mesh screen assembly has a length longer than the length of the midsection riser pipe, the length portion longer than the midsection riser pipe has at least one slit therein.

20. The pipe system of claim 12, where the riser mesh screen assembly has a length longer than the length of the midsection riser pipe, the length portion longer than the midsection riser pipe having a pair of slits therein to create a pair of flaps.

* * * * *